United States Patent
Koyama et al.

(10) Patent No.: US 12,038,089 B2
(45) Date of Patent: Jul. 16, 2024

(54) PISTON RING

(71) Applicant: TOYOTA JIDOSHA KABUSHIKI KAISHA, Aichi-ken (JP)

(72) Inventors: Takashi Koyama, Mishima (JP); Takashi Suzuki, Izunokuni (JP); Naoki Tsuneishi, Susono (JP); Minoru Uchiyama, Okaya (JP); Yuzuru Shiratori, Susono (JP); Yuuichiro Wada, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 94 days.

(21) Appl. No.: 17/751,528

(22) Filed: May 23, 2022

(65) Prior Publication Data

US 2022/0403932 A1 Dec. 22, 2022

(30) Foreign Application Priority Data

Jun. 16, 2021 (JP) ................................ 2021-100021

(51) Int. Cl.
*F16J 9/16* (2006.01)
(52) U.S. Cl.
CPC ..................................... *F16J 9/16* (2013.01)
(58) Field of Classification Search
CPC .. F16J 9/16; F16J 9/12; F16J 9/06; F16J 9/00
See application file for complete search history.

(56) References Cited

U.S. PATENT DOCUMENTS

| | | | | |
|---|---|---|---|---|
| 1,752,848 A | * | 4/1930 | Howard | F16J 9/16 277/487 |
| 2,937,061 A | * | 5/1960 | Folkerts | F16J 9/06 277/498 |
| 5,028,055 A | * | 7/1991 | Rehfeld | F16J 9/206 277/476 |
| 5,031,051 A | | 7/1991 | Kim | |
| 5,275,422 A | * | 1/1994 | Rehfeld | F16J 9/06 92/208 |
| 2017/0356547 A1 | * | 12/2017 | Simpson | F16J 9/12 |

FOREIGN PATENT DOCUMENTS

| | | | |
|---|---|---|---|
| CN | 1479028 A | | 3/2004 |
| JP | 58088439 A | * | 5/1983 |
| JP | S60-037458 A | | 2/1985 |
| JP | 02199370 A | * | 8/1990 |
| JP | H03-121374 A | | 5/1991 |

(Continued)

*Primary Examiner* — Eugene G Byrd
(74) *Attorney, Agent, or Firm* — HAUPTMAN HAM, LLP

(57) ABSTRACT

A piston ring includes a plurality of first ring pieces placed inside the ring groove in a stacking manner such that the first ring pieces adhere to each other in the axis direction. The first ring pieces include respective piston ring gap portions each having end surfaces separated from each other in the circumferential direction of the first ring pieces such that the end surfaces face each other via a ring gap having a predetermined dimension. The respective piston ring gap portions of the first ring pieces are displaced from each other in the circumferential direction. A closing member is provided to close the piston ring gap portions of the first ring pieces in the radial direction of the first ring pieces.

12 Claims, 11 Drawing Sheets

(56) References Cited

FOREIGN PATENT DOCUMENTS

| | | | | |
|---|---|---|---|---|
| JP | H10-148262 | A | | 6/1998 |
| JP | 2000-130257 | A | | 5/2000 |
| JP | 2008-14424 | A | | 1/2008 |
| JP | 2010-31995 | A | | 2/2010 |
| JP | 2011002023 | A | * | 1/2011 |
| JP | 2012-117393 | A | | 6/2012 |
| JP | 2017155843 | A | * | 9/2017 |
| JP | 2019190628 | A | * | 10/2019 .......... F04B 39/0022 |

* cited by examiner

PISTON RING

CROSS-REFERENCE TO RELATED APPLICATION

This application claims priority to Japanese Patent Application No. 2021-100021 filed on Jun. 16, 2021, incorporated herein by reference in its entirety.

BACKGROUND

1. Technical Field

The present disclosure relates to a piston ring attached to a piston of an internal combustion engine, particularly to a piston ring configured to mainly seal blowby gas.

2. Description of Related Art

A piston ring is partially opened up and does not have a complete annular shape. The piston ring is configured such that its outside diameter elastically increases and decreases. The part thus opened up is referred to as a piston ring gap (or a piston ring gap portion). Since the piston ring gap portion is a part penetrating through the piston ring in its width direction (a dimension measured in the axis direction of the piston ring is referred to as a width), the piston ring gap portion may serve as a passage for blowby gas. In view of this, in the related art, various techniques to prevent leakage of blowby gas or to reduce the leakage to a feasible extent have been devised and proposed as disclosures.

For example, Japanese Unexamined Patent Application Publication No. 2010-31995 (JP 2010-31995 A) describes a piston ring constituted by an upper ring and a lower ring stacked in the width direction of the piston ring such that respective piston ring gap portions of the rings are displaced from each other in the circumferential direction of the piston ring. The piston ring gap portion of the upper ring has a shape just opened up in the width direction or has a slit shape opened up to be inclined by 45° from the width direction, for example. On the other hand, the piston ring gap portion of the lower ring has a stepped shape in which end parts facing each other in the piston ring gap portion overlap with each other in the thickness direction of the lower ring such that an inner peripheral portion of a first end part out of the end parts is cut in half in thickness (the thickness indicates a dimension measured in the radial direction of the lower ring), and an outer peripheral portion of a second end part out of the end parts is cut in half in thickness. Alternatively, the piston ring gap portion of the lower ring is inclined in a direction reverse to the inclined piston ring gap portion in the upper ring.

Further, Japanese Unexamined Patent Application Publication No. 2000-130257 (JP 2000-430257 A) describes a piston ring constituted by an outer peripheral ring and an inner peripheral ring. The outer peripheral ring includes a piston ring gap portion having a stepped structure in the width direction. On the other hand, the inner peripheral ring may include any type of piston ring gap portion such as a perpendicular piston ring gap, a diagonal piston ring gap, or a stepped piston ring gap. The piston ring gap portions of the outer peripheral ring and the inner peripheral ring are placed to be displaced from each other in the circumferential direction.

Further, Japanese Unexamined Patent Application Publication No. 2008-14424 (JP 2008-14424 A) describes a piston ring configured such that respective end surfaces constituting a piston ring gap portion and facing each other are provided as inclined surfaces formed such that an upper space between the end surfaces in the width direction (an up-down direction) gradually increases, and a triangular piston ring gap piece having inclined surfaces making contact with the inclined surfaces is fined in the piston ring gap portion from the upper side.

SUMMARY

In the piston ring described in JP 2010-31995 A, the upper face of the lower ring makes contact with the lower side of the piston ring gap portion of the upper ring, and similarly, the lower face of the upper ring makes contact with the upper side of the piston ring gap portion of the lower ring. Accordingly, each of the piston ring gap portions is closed by its counterpart ring (the lower ring or the upper ring) in the width direction (the up-down direction). That is, a gas passage connected in the width direction is not formed. However, a ring groove where the piston ring is placed is configured such that the piston ring expands and contracts radially. That is, the outside diameter of a groove bottom of the ring groove is smaller than the inside diameter of the piston ring, so that a gap is formed between the ring groove and the piston ring. In the configuration described in JP 2010-31995 A, the piston ring gap portion of the upper ring and the piston ring gap portion of the lower ring are opened to the gap on the groove bottom side of the ring groove and are connected to each other. Accordingly, the piston ring gap portion of the upper ring and the piston ring gap portion of the lower ring communicate with each other via the gap on the groove bottom side of the ring groove so that a gas passage is formed. In this respect, the configuration described in JP 2010-31995 A may have a poor gas sealing property.

Note that, in a case where the piston ring gap portion of the lower ring has a stepped structure in the thickness direction, a thin-plate part extending from the first end part and a thin-plate part extending from the second end part overlap with each other in the thickness direction, so that a linear passage in the thickness direction (the radial direction) is not formed. However, in order to avoid or restrain a bending load from being applied to respective base parts of the thin-plate parts, the thin-plate parts face each other via a slight gap so that they do not come into contact with each other. Because of this, the gap serves as a gas passage via which the inner peripheral side communicates with the outer peripheral side. Eventually, the configuration described in JP 2010-31995 A does not solve the problem of the gas passage that may cause leakage of blowby gas, and there is room for improvement in this respect.

Further, the piston ring described in JP 2000-130257 A is a piston ring having a configuration that can be regarded as a configuration in which the upper ring described in JP 2010-31995 A is replaced with the inner peripheral ring, and the lower ring described in JP 2010-31995 A is replaced with the outer peripheral ring. That is, the piston ring gap portion of the outer peripheral ring and the piston ring gap portion of the inner peripheral ring are displaced from each other in the circumferential direction. Accordingly, the inner peripheral ring makes contact with the inner peripheral side of the piston ring gap portion of the outer peripheral ring so as to close the piston ring gap portion from the inner peripheral side, and the outer peripheral ring makes contact with the outer peripheral side of the piston ring gap portion of the inner peripheral ring so as to close the piston ring gap portion from the outer peripheral side. As a result, a gas passage via which the inner peripheral side and the outer peripheral side of the piston ring linearly communicate with each other is not formed. However, the piston ring gap portion of the outer peripheral ring is what is called a stepped piston ring gap in which thin-plate parts face each other in the thickness direction (the radial direction). Accordingly, a gap is formed between the thin-plate parts, and the gap serves as a gas passage. This is similar to the configuration described in JP 2010-31995 A. Eventually, the configuration described in JP 2000-130257 A does not solve the problem of the gas passage that may cause leakage of blowby gas, including the inconvenience caused due to the stepped piston ring gap, and there is room for improvement in this respect.

Further, the configuration described in JP 2008-14424 A is examined as follows. It is necessary for the piston ring to expand and contract in accordance with temperature changes, and therefore, a gap in the piston ring gap portion (a space between the end surfaces) changes in accordance with temperature changes. In the configuration described in JP 2008-14424 A, the piston ring gap piece fitted in the piston ring gap portion makes contact with the facing surfaces opened toward the upper side. Accordingly, the piston ring gap piece moves up and down in response to changes in the space between the facing surfaces. As a result, the piston ring gap piece gets stuck in the piston ring gap portion, and a state where the piston ring gap piece makes contact with the end surfaces is maintained. However, it is necessary to provide a gap on the upper side or the lower side of the piston ring gap piece to enable the piston ring gap piece to move up and down, so that the gap serves as a gas passage via which the outer peripheral side and the inner peripheral side of the piston ring communicate with each other. JP 2008-14424 A describes a configuration in which a guide configured to apply a load to the piston ring gap piece in the radial direction is provided. However, the guide is integrated with the piston ring gap piece, and the guide also moves up and down along with movements of the piston ring gap piece in the up-down direction. Eventually, a gap is formed above or below the guide, and the gap serves as a gas passage.

The present disclosure is accomplished in view of the above technical problems, and an object of the present disclosure is to provide a piston ring that can eliminate, to a feasible extent, a gas passage that causes leakage of blowby gas.

In order to achieve the above object, a piston ring of the present disclosure is a piston ring having an annular shape opened at a piston ring gap portion. The piston ring is placed inside a ring groove formed in an outer peripheral portion of a piston configured to reciprocate inside a bore along the axis direction of the bore. The piston ring is configured to slide with an outer peripheral portion of the piston ring being pressed against an inner peripheral surface of the bore. The piston ring includes a plurality of first ring pieces placed inside the ring groove in a stacking manner such that the first ring pieces adhere to each other in the axis direction. The first ring pieces include respective piston ring gap portions each having end surfaces separated from each other in the circumferential direction of the first ring pieces such that the end surfaces face each other via a ring gap having a predetermined dimension. The respective piston ring gap portions of the first ring pieces are displaced from each other in the circumferential direction. A closing member is further provided such that the piston ring gap portions of the first ring pieces are closed in the radial direction of the first ring pieces.

In the present disclosure, the closing member may be constituted by a second ring placed on an inner peripheral side from the first ring pieces inside the ring groove and configured to close open ends, on the inner peripheral side, of the respective piston ring gap portions of the first ring pieces by making contact with inner peripheral surfaces of the first ring pieces. The second ring may include a piston ring gap portion opened in the circumferential direction. The piston ring gap portion of the second ring may be displaced, in the circumferential direction, from at least the piston ring gap portion of a first ring piece placed on an uppermost side in the up-down direction of the piston among the first ring pieces.

In the present disclosure, the second ring may be constituted by a plurality of second ring pieces stacked in an adhering manner in the same direction as a stacking direction of the first ring pieces.

In the present disclosure, the second ring pieces may include respective piston ring gap portions opened in the circumferential direction. The respective piston ring gap portions of the second ring pieces may be displaced from each other in the circumferential direction. The respective piston ring gap portions of the second ring pieces may be displaced, in the circumferential direction, from the respective piston ring gap portions of the first ring pieces.

In the present disclosure, the piston ring gap portion of a first ring piece on an uppermost side in the axis direction among the first ring pieces may have a pair of first end surfaces provided such that the first end surfaces are separated from each other via a predetermined ring gap in the circumferential direction. The ring gap as a space between the first end surfaces may gradually decrease inwardly in the radial direction of the first ring piece on the uppermost side. The closing member may be constituted by a first plug piece put between the first end surfaces from an outer peripheral side of the first ring piece on the uppermost side such that the first plug piece is movable in the radial direction of the first ring piece on the uppermost side while a state where the first plug piece adheres to the first end surfaces is maintained.

In the present disclosure, the piston ring may further include a first pressing member configured to elastically press the first plug piece inwardly in the radial direction of the first ring piece on the uppermost side inside the piston ring gap portion of the first ring piece on the uppermost side.

In the present disclosure, the piston ring gap portion of a second first ring piece placed below the first ring piece on the uppermost side in the axis direction may have a pair of second end surfaces provided such that the second end surfaces are separated from each other via a predetermined ring gap in the circumferential direction. The ring gap as a space between the second end surfaces may gradually decrease outwardly in the radial direction of the second first ring piece. The closing member may further include a second plug piece put between the second end surfaces from an inner peripheral side of the second first ring piece such that the second plug piece is movable in the radial direction of the second first ring piece while a state where the second plug piece adheres to the second end surfaces is maintained.

In the present disclosure, the piston ring may further include a second pressing member configured to elastically press the second plug piece outwardly in the radial direction of the second first ring piece inside the piston ring gap portion of the second first ring piece.

In the present disclosure, the closing member may be constituted by an inner-peripheral-side curved member provided on an inner peripheral surface of each of the first ring pieces in an adhering manner such that the inner-peripheralside curved member closes the piston ring gap portion of the each of the first ring pieces, the inner-peripheral-side curve member being provided per piston ring gap portion. Either one of opposite parts of the inner-peripheral-side curved member across the piston ring gap portion may be joined to the each of the first ring pieces.

In the present disclosure, the piston ring includes the first ring pieces stacked in the up-down direction in an adhering manner. The piston ring gap portions of the first ring pieces are displaced from each other in the circumferential direction. Accordingly, the piston ring gap portion of each of the first ring pieces is closed by a second first ring piece placed on the upper side or the lower side of the each of the first ring pieces. Accordingly, a so-called gas passage as a gap part that allows communication in the up-down direction is not formed. Further, each of the piston ring gap portions is closed by the closing member in the radial direction. Accordingly, a so-called gas passage as a gap part that allows communication in the radial direction due to the piston ring gap portion is not formed. Eventually, with the present disclosure, a gas passage that allows communication between the upper side and the lower side of the piston ring is eliminated or restrained, thereby making it possible to effectively prevent or reduce leakage of blowby gas.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure can be carried out for a piston ring attached to a piston in an internal combustion engine such as a gasoline engine or a diesel engine. The following describes embodiments of the present disclosure. Note that the embodiments described below are just examples of the present disclosure and do not limit the present disclosure.

Figure 1:
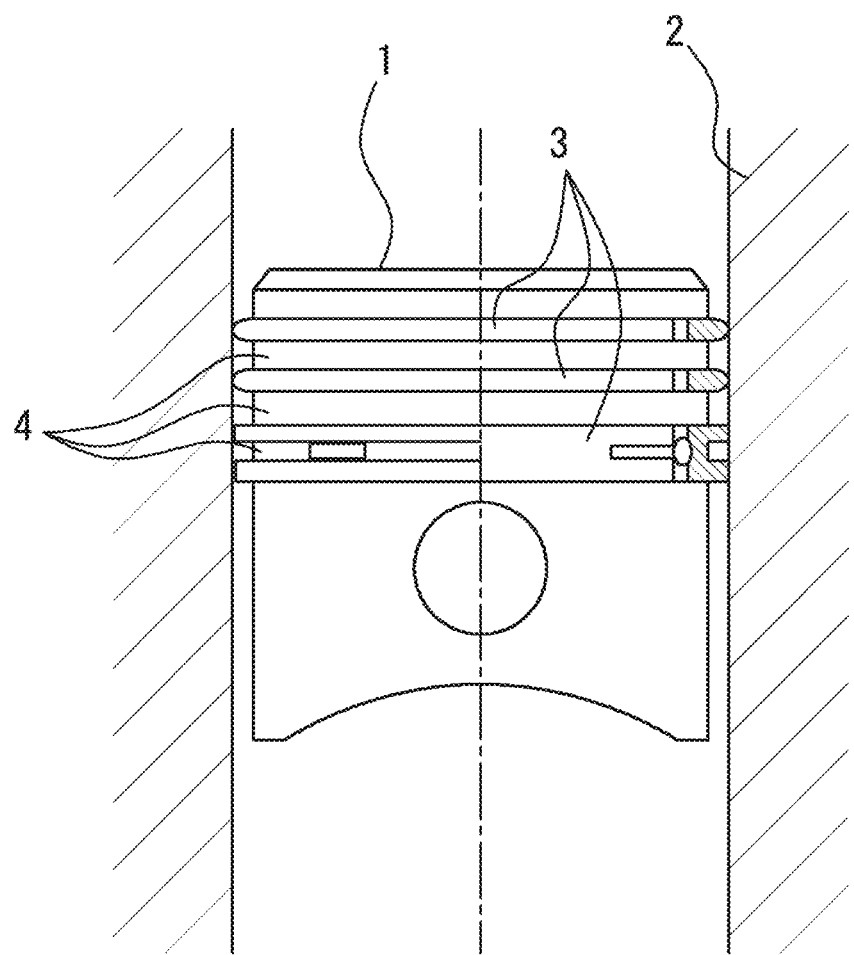
FIG. 1 is a front view of a partial section illustrating one example of a piston to which a piston ring is attached.

FIG. 1 illustrates a general structure of the piston of the internal combustion engine in a simplified manner. A piston 1 is accommodated inside a bore 2 of a cylinder such that the piston 1 reciprocates in the axis direction of the bore 2. Ring grooves 3 are formed in an outer peripheral portion, on the upper end side, of the piston 1, and respective piston rings 4 are fitted in the ring grooves 3. The piston ring 4 is constituted by three rings in total, i.e., two compression rings and one oil ring, as one example. In the example illustrated in FIG. 1, two rings on the upper side are compression rings, and one ring on the lower side is an oil ring.

Figure 2:
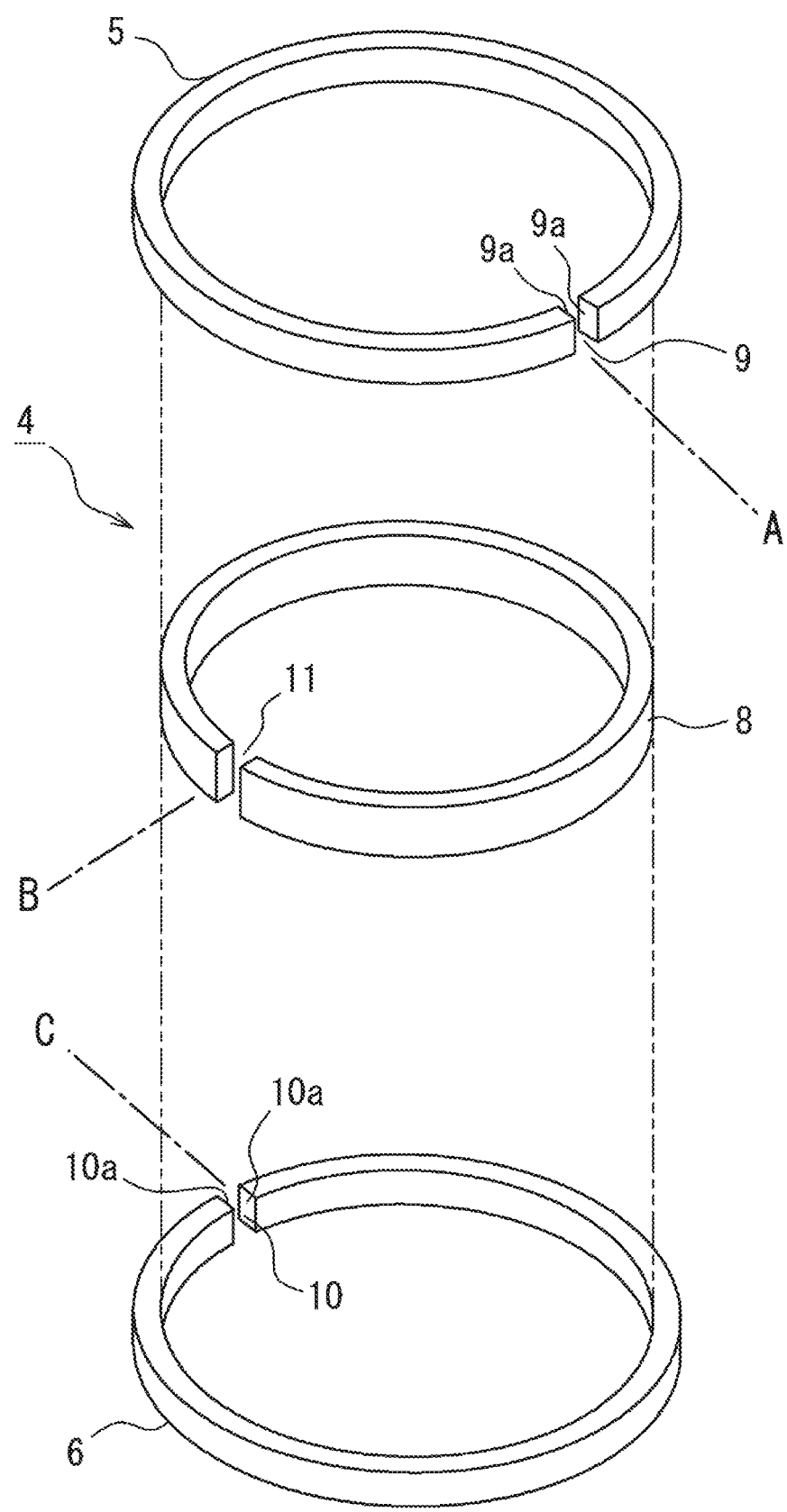
FIG. 2 is a perspective view illustrating one example of the piston ring according to the present disclosure in an exploded manner.

The present disclosure is mainly applicable to a compression ring, and an example of this case is illustrated in FIG. 2 as an exploded view. The piston ring 4 illustrated herein is constituted by an outer peripheral ring 7 including two ring pieces 5, 6 stacked in a direction (the width direction) along the central axis of the piston ring 4, and an inner peripheral ring 8 placed on the inner peripheral side from the ring pieces 5, 6. The two ring pieces 5, 6 in the outer peripheral ring 7 correspond to first ring pieces in the present disclosure. The two ring pieces 5, 6 are made of metal similar to metal used in a conventional compression ring and have an annular shape opened at piston ring gap portions 9, 10 and thus do not have a complete annular shape. The piston ring gap portions 9, 10 are parts where ring gaps with a predetermined dimension are provided such that the outside diameters of the ring pieces 5, 6 increase and decrease. A space between end surfaces 9a facing each other in the circumferential direction of the ring piece 5 and a space between end surfaces 10a facing each other in the circumferential direction of the ring piece 6 correspond to the ring gaps.

The outside diameter (the outside diameter in a free state where no load is applied) of the ring piece 5, 6 is larger than the inside diameter of the bore 2, and the inside diameter (the inside diameter in a usage state where the piston 1 is fitted in the bore 2) of the ring piece 5, 6 is larger than the outside diameter of a groove bottom of the ring groove 3. Further, the shape of an outer peripheral portion of the ring piece 5, 6 that makes slide contact with the bore 2 may be any appropriate shape known conventionally such as a barrel shape, a tapered shape, a bevel shape, or a plane shape. Further, the piston ring gap portion 9, 10 may be any of what is called a perpendicular piston ring gap, a diagonal piston ring gap, a stepped piston ring gap, and so on that are conventionally known.

The inner peripheral ring 8 corresponds to a closing member in the present disclosure and is an annular member fitted in respective inner peripheral sides of the ring pieces 5, 6 (that is, the outer peripheral ring 7) stacked in the width direction in an adhering manner. The inner peripheral ring 8 is configured to elastically deform such that the outside diameter of the inner peripheral ring 8 increases and decreases. In order to achieve such a deformation, a piston ring rap portion 11 is provided in the inner peripheral ring 8, similarly to the ring pieces 5, 6. The outside diameter (the outside diameter in a so-called free state where no load is applied) of the inner peripheral ring 8 is equal to or more than the inside diameter of the outer peripheral ring 7 in a state where the outer peripheral ring 7 is fitted in the bore 2, so that the inner peripheral ring 8 is configured to adhere to the inner peripheral surface of the outer peripheral ring 7 by an elastic force. Note that, since the inner peripheral ring 8 is accommodated inside the ring groove 3 together with the outer peripheral ring 7, the inside diameter of the inner peripheral ring 8 is larger than the outside diameter of the groove bottom of the ring groove 3. Further, the inner peripheral ring 8 covers the whole inner peripheral sides of the piston ring gap portions 9, 10 of the outer peripheral ring 7 so as to close respective open ends on the inner peripheral sides of the piston ring gap portions 9, 10. Accordingly, the width (a dimension measured in the axis direction) of the inner peripheral ring 8 is set to be equal to or larger than the width (a total width of the ring pieces 5, 6 stacked in an adhering manner) of the outer peripheral ring 7. Note that the shape of the piston ring gap portion 11 of the inner peripheral ring 8 may be any conventionally known shape such as a perpendicular piston ring gap, a diagonal piston ring gap, or a stepped piston ring gap, similarly to the shapes of the piston ring gap portions 9, 10 of the ring pieces 5, 6.

Figure 3:
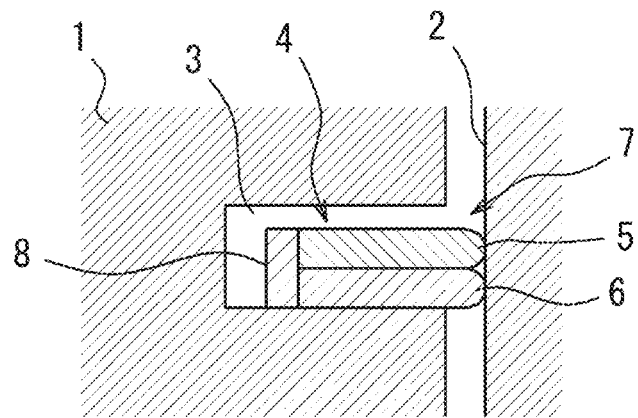
FIG. 3 is a partial sectional view of the piston ring in a state where the piston ring is accommodated in a ring groove.

In a state where the ring pieces 5, 6 stacked in the width direction in an adhering manner and the inner peripheral ring 8 is fitted in the inner peripheral sides of the ring pieces 5, 6, the ring pieces 5, 6, are assembled inside the ring groove 3. This state is illustrated in FIG. 3 as a partial sectional view. As described above, the outside diameters of the ring pieces 5, 6 (the outer peripheral ring 7) in a so-called free state are larger than the inside diameter of the bore 2. Accordingly, in a state where the ring pieces 5, 6 are attached to the piston 1 and inserted into the bore 2 of the cylinder, the ring pieces 5, 6 are elastically deformed such that the outside diameters are decreased, and tensile forces are applied to the ring pieces 5, 6, so that the ring pieces 5, 6 are pressed against the inner surface of the bore 2 by the tensile forces so as to maintain an airtight state.

The inner peripheral ring 8 assembled to the inner peripheral sides of the ring pieces 5, 6 is elastically deformed due to the decrease of the ring pieces 5, 6 in diameter and is pressed against the inner peripheral surfaces of the ring pieces 5, 6 in an adhering manner by a tensile force caused by the elastic deformation. Accordingly, the ring pieces 5, 6 are pressed against the inner peripheral surface of the bore 2 by their own tensile forces and the tensile force received from the inner peripheral ring 8. These tensile forces are set in design such that the ring pieces 5, 6 are not separated from the inner surface of the bore 2 by a gas pressure, and a frictional force between the piston 1 and the bore 2 at the time when the piston 1 moves up and down does not become excessive. Further, in a state where the piston ring 4 makes contact with the lower face of the ring groove 3 as illustrated in FIG. 3, no gap is formed between the piston ring 4 and the lower face of the ring groove 3 except the piston ring gap portions 9, 10, 11.

The ring pieces 5, 6 and the inner peripheral ring 8 are set inside the ring groove 3 such that the piston ring gap portions 9, 10, 11 are displaced from each other in the circumferential direction so that the piston ring gap portions 9, 10, 11 do not form a gas passage. The state where the piston ring gap portions 9, 10, 11 are displaced from each other in the circumferential direction are illustrated in FIG. 2. This is to prevent the piston ring gap portions 9, 10, 11 from forming a gas passage, by closing the piston ring gap portions 9, 10, 11 by the ring pieces 5, 6 and the inner peripheral ring 8.

Figure 4A:
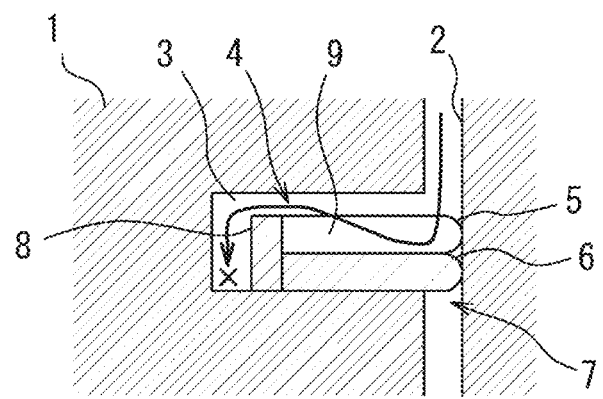
FIG. 4A is a sectional view similar to FIG. 3 and is a partial sectional view of a part indicated by a reference sign "A" in FIG. 2.

More specifically, FIG. 4A is a sectional view of the piston ring 4 cut at a position "A" in FIG. 2 in a state where the piston ring 4 adheres to the lower face of the ring groove 3. The difference between the width of the piston ring 4 and an opening width (a dimension measured in the up-down direction in FIG. 4A) of the ring groove 3 is usually around 0.02 mm to 0.03 mm. Accordingly, a gap is formed on the upper side from the piston ring 4. In addition, the ring piece 5 on the upper side is opened at the piston ring gap portion 9. As a result, a combustion chamber (not illustrated) communicates with the inside of the ring groove 3 by the gap and the piston ring gap portion 9. In the meantime, since the ring piece 5 on the upper side adheres to the ring piece 6 on the lower side, a lower opening of the piston ring gap portion 9 of the ring piece 5 on the upper side is sealed by the ring piece 6 on the lower side. Accordingly, the piston ring gap portion 9 does not penetrate in the up-down direction and does not serve as a gas passage leading to a crank chamber (not illustrated) from the combustion chamber. Further, the ring piece 6 on the lower side and the inner peripheral ring 8 adhering to the inner peripheral surface of the ring piece 6 on the lower side adhere to the lower face of the ring groove 3, and an airtight state is formed between the lower face of the ring groove 3 and each of the ring piece 6 on the lower side and the inner peripheral ring 8. Besides, an outer peripheral end of the ring piece 6 on the lower side airtightly makes contact with the inner peripheral surface of the bore 2, and therefore, the inside of the ring groove 3 is shielded airtightly from the crank chamber. Accordingly, even when blowby gas flows and reaches the inside of the ring groove 3 like a curve indicated by an arrow in FIG. 4A, for example, the blowby gas is stopped at a part indicated by "X" in FIG. 4A. That is, even in a case where the piston ring gap portion 9 is formed in the ring piece 5 on the upper side, the piston ring gap portion 9 does not serve as a gas passage via which the combustion chamber communicates with the crank chamber.

Figure 4B:
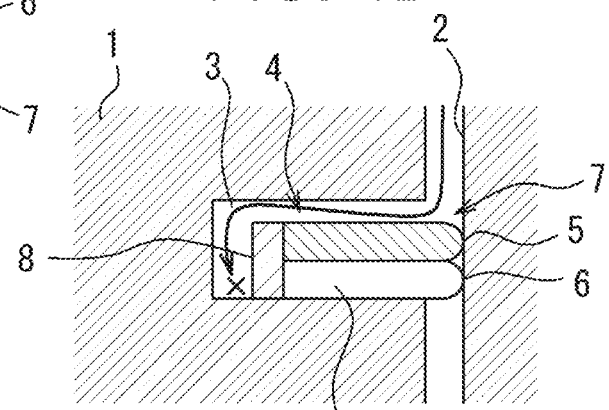
FIG. 4B is a sectional view similar to FIG. 3 and is a partial sectional view of a part indicated by a reference sign "B" in FIG. 2.

FIG. 4B is a sectional view of the piston ring 4 cut at a position "B" in FIG. 2 in the state where the piston ring 4 adheres to the lower face of the ring groove 3. The gap described above is formed between the piston ring 4 and the upper face of the ring groove 3, and the inside of ring groove 3 communicates with the combustion chamber via the gap. Further, since the piston ring gap portion 10 is provided in the ring piece 6 on the lower side, the inside of the ring groove 3 partially communicates with the crank chamber via the piston ring gap portion 10. However, since the ring piece 5 on the upper side adheres to the upper side of the piston ring gap portion 10, the upper side of the piston ring gap portion 10 is closed by the ring piece 5 on the upper side. Further, the inner peripheral ring 8 adheres to the inner peripheral surface of the ring piece 6 on the lower side, and besides, the inner peripheral ring 8 airtightly adheres to the lower face of the ring groove 3. Accordingly, even when blowby gas flows and reaches the inside of the ring groove 3 like a curve indicated by an arrow in FIG. 4B, for example, the blowby gas is stopped at a part indicated by "X" in FIG. 4B. Accordingly, the piston ring gap portion 10 of the ring piece 6 on the lower side is sealed by the ring piece 5 on the upper side and the inner peripheral ring 8 in the upper direction (the axis direction) and in the radial direction, and therefore, even in a case where the piston ring gap portion 10 is formed in the ring piece 6 on the lower side, the piston ring gap portion 10 does not serve as a gas passage via which the combustion chamber communicates with the crank chamber.

Figure 4C:
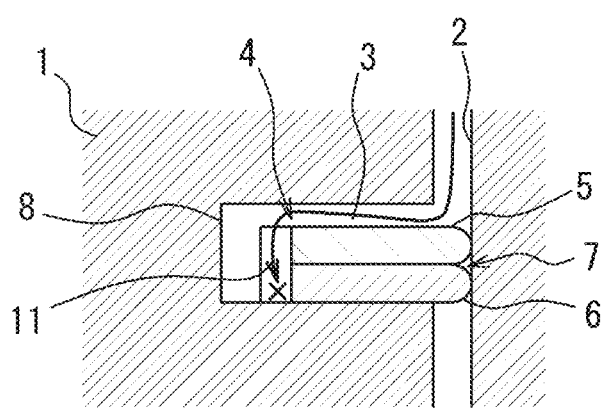
FIG. 4C is a sectional view similar to FIG. 3 and is a partial sectional view of a part indicated by a reference sign "C" in FIG. 2.

FIG. 4C is a sectional view of the piston ring 4 cut at a position "C" in FIG. 2 in the state where the piston ring 4 adheres to the lower face of the ring groove 3. The gap is formed between the piston ring 4 and the upper face of the ring groove 3 similarly to the cases of FIGS. 4A, 4B described above. Accordingly, the inside of the ring groove 3 communicates with the combustion chamber. The inner peripheral surfaces of the ring pieces 5, 6 are exposed to the inside of the ring groove 3 at the piston ring gap portion 11 in the inner peripheral ring 8. The ring pieces 5, 6 adhere to each other substantially airtightly, and similarly to this, the ring piece 6 on the lower side also airtightly adheres to the lower face of the ring groove 3. Accordingly, blowby gas does not pass through between the ring pieces 5, 6 and between the lower face of the ring piece 6 on the lower side and the lower face of the ring groove 3. Accordingly, even when blowby gas flows and reaches the inside of the ring groove 3 like a curve indicated by an arrow in FIG. 4C, for example, the blowby gas is stopped at a part indicated by "X" in FIG. 4C. Eventually, even in a case where the piston ring gap portion 11 is formed in the inner peripheral ring 8, the piston ring gap portion 11 does not serve as a gas passage via which the combustion chamber communicates with the crank chamber.

Note that, in the embodiment described herein, the ring pieces 5, 6 adhere to each other, and this functions to eliminate a gas passage or block blowby gas. The reason is as follows. That is, the ring pieces 5, 6 are just stacked on each other, and therefore, a contact pressure between the ring pieces 5, 6 is not particularly limited, so that the ring pieces 5, 6, can make contact with each other firmly to such an extent that a load is applied to each other. On the other hand, in a case of a structure like thin-plate pieces in a stepped piston ring gap, for example, the thin-plate pieces might break due to application of a bending load or might break due to fatigue even by a small bending load. In such a structure, it is necessary to set a slight clearance so that the thin-plate pieces do not come into contact with each other. Due to the clearance, the outer peripheral side of the piston ring gap portion or an upper opening of the piston ring gap portion communicates with the inner peripheral side of the piston ring gap portion or a lower opening of the piston ring gap portion, so that the clearance serves as a gas passage. In the above embodiment, it is not necessary to provide such a clearance between the ring pieces 5, 6. Accordingly, the configuration in which the ring pieces 5, 6 are stacked in the width direction in an adhering manner effectively functions for elimination of a gas passage, greatly differently from the configuration in which thin-plate pieces are stacked in a stepped piston ring gap.

Figure 5A:
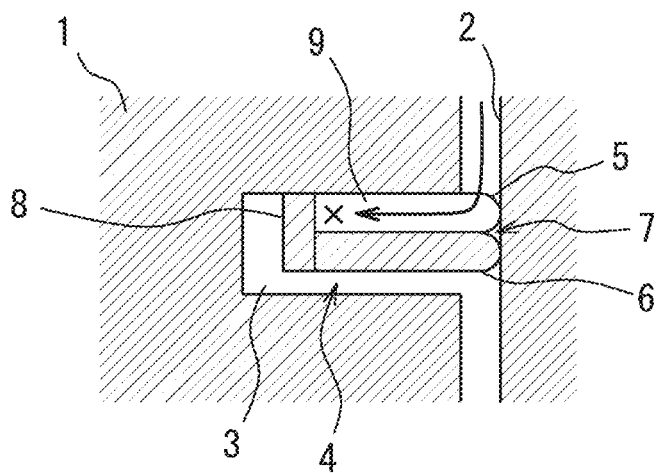
FIG. 5A is a sectional view illustrating a state where the piston ring adheres to an upper face of the ring groove and is a partial sectional view of the part indicated by the reference sign "A" in FIG. 2.

In the meantime, at the time of a high-speed operation, there is such a case that inertia force of the piston ring 4 becomes large, and the piston ring 4 makes contact with the upper face of the ring groove 3 in expansion stroke or intake stroke. FIG. 5A illustrates such a state. Even in this case, the embodiment of the present disclosure effectively functions for elimination of a gas passage. That is, in a state where the piston ring 4 is pressed against the upper face of the ring groove 3 in an adhering manner, no gap is formed between the piston ring 4 and the upper face of the ring groove 3 except the piston ring gap portions 9, 10, 11. Further, in the piston ring gap portions 9, 10, 11, the following sealing state is established, so that no gas passage is formed.

That is, FIG. 5A is a sectional view of the piston ring 4 cut at the position "A" in FIG. 2 in a state where the piston ring 4 adheres to the upper face of the ring groove 3. Since the piston ring gap portion 9 of the ring piece 5 on the upper side is opened upward, the piston ring gap portion 9 communicates with the combustion chamber. However, since the ring piece 6 on the lower side adheres to the ring piece 5 on the upper side, a lower opening of the piston ring gap portion 9 is sealed by the ring piece 6 on the lower side. Further, since the inner peripheral ring 8 adheres to the inner peripheral surface of the ring piece 5 on the upper side, an inner peripheral opening of the piston ring gap portion 9 is sealed by the inner peripheral ring 8. Since the upper face of the inner peripheral ring 8 adheres to the upper face of the ring groove 3, the piston ring gap portion 9 of the ring piece 5 on the upper side is eventually closed to the inside of the ring groove 3. Accordingly, even when blowby gas flows and reaches the inside of the ring groove 3 like a curve indicated by an arrow in FIG. 5A, for example, the blow by gas is stopped at a part indicated by "X" in FIG. 5A. That is, even in a case where the piston ring gap portion 9 is formed in the ring piece 5 on the upper side, the piston ring gap portion 9 does not serve as a gas passage via which the combustion chamber communicates with the crank chamber.

Figure 5B:
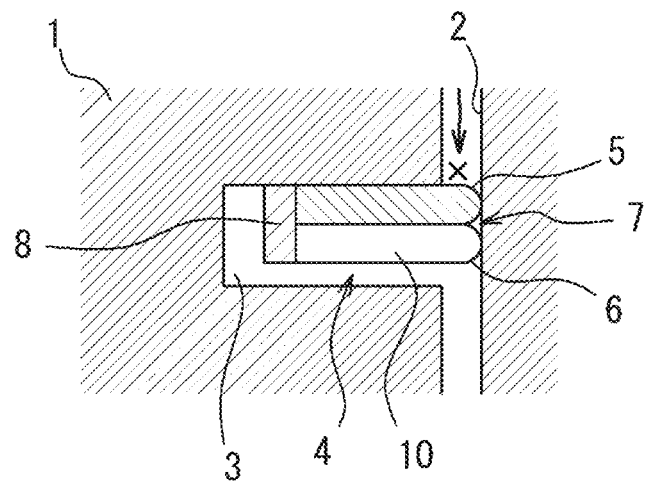
FIG. 5B is a sectional view illustrating the state where the piston ring adheres to the upper face of the ring groove and is a partial sectional view of the part indicated by the reference sign "B" in FIG. 2.

FIG. 5B is a sectional view of the piston ring 4 cut at the position "B" in FIG. 2 in the state where the piston ring 4 adheres to the upper face of the ring groove 3. As illustrated in FIG. 5B, in this part, the piston ring gap portion 10 is formed in the ring piece 6 on the lower side. However, a part of the ring piece 5 on the upper side other than the piston ring gap portion 9 adheres to the upper face of the ring groove 3, and an outer peripheral end of the ring piece 5 adheres to the inner peripheral surface of the bore 2. Accordingly, the gap between the piston 1 and the bore 2 is eventually closed by the ring piece 5 on the upper side. Accordingly, even when blowby gas flows like a curve indicated by an arrow in FIG. 5B, for example, the blowby gas is stopped at a part indicated by "X" in FIG. 5B. That is, even in this part, a gas passage via which the combustion chamber communicates with the crank chamber is not formed.

Figure 5C:
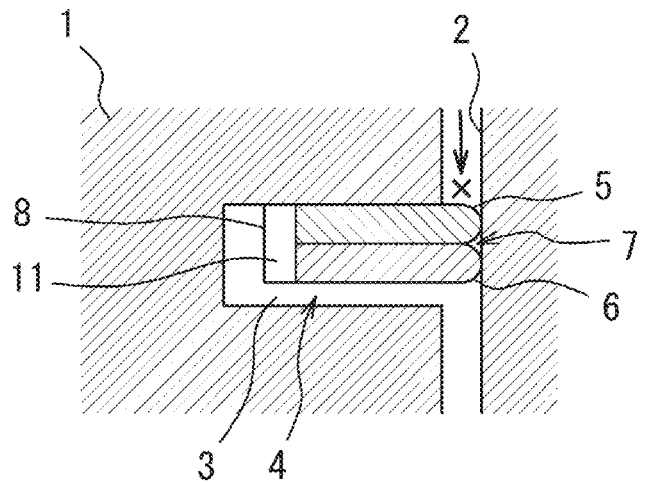
FIG. 5C is a sectional view illustrating the state where the piston ring adheres to the upper face of the ring groove and is a partial sectional view of the part indicated by the reference sign "C" in FIG. 2.

FIG. 5C is a sectional view of the piston ring 4 cut at the position "C" in FIG. 2 in the state where the piston ring 4 adheres to the upper face of the ring groove 3. Even in this case, the ring piece 5 on the upper side closes the gap between the piston 1 and the bore 2 above the ring groove 3. Accordingly, even when blowby gas flows like a curve indicated by an arrow in FIG. 5C, for example, the blowby gas is stopped at a part indicated by "X" in FIG. 5C. That is, similarly to the part illustrated in FIG. 5B, a gas passage via which the combustion chamber communicates with the crank chamber is not formed.

Figure 6A:
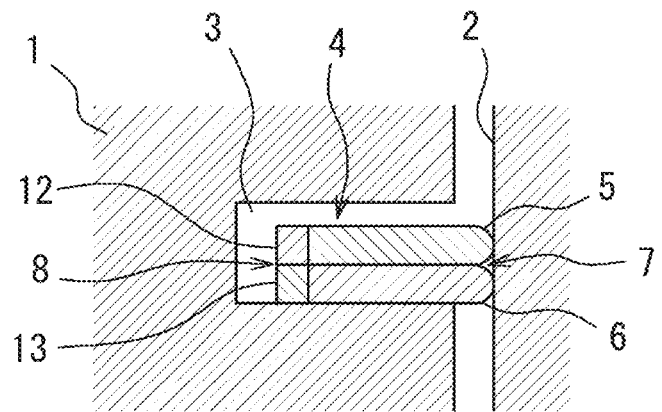
FIG. 6A is a partial sectional view to describe an embodiment in which an inner peripheral ring is divided into two pieces in the up-down direction and is a partial sectional view illustrating a state where the piston ring adheres to a lower face of the ring groove.

As described above, the inner peripheral ring 8 functions to close the piston ring gap portions 9, 10 provided in the outer peripheral ring 7, from the inner peripheral side. In the above embodiment, the two piston ring gap portions 9, 10 on the upper side and on the lower side are closed by one inner peripheral ring 8. However, the present disclosure is not limited to such a configuration. Similarly to the outer peripheral ring 7, the inner peripheral ring 8 may be constituted by two (a plurality of) ring pieces stacked in the width direction (the stacking direction of the ring pieces 5, 6). FIG. 6A illustrates this example. Inner peripheral ring pieces 12, 13 corresponding to the ring pieces 5, 6, respectively, are provided on the inner peripheral sides of the ring piece 5, 6 constituting the outer peripheral ring 7. The inner peripheral ring pieces 12, 13 correspond to second ring pieces in the present disclosure. The inner peripheral ring pieces 12, 13 are obtained by dividing the inner peripheral ring 8 in two pieces at a central part of the inner peripheral ring 8 in the width direction. Accordingly, the inner peripheral ring pieces 12, 13 include respective piston ring gap portions, although not illustrated herein particularly.

The inner peripheral ring pieces 12, 13 in an embodiment illustrated in FIG. 6A adhere to each other in the width direction in a normal state and also adhere to respective inner peripheral surfaces of their corresponding ring pieces 5, 6 on the outer peripheral side. Accordingly, in a state where the inner peripheral ring pieces 12, 13 adhere to each other and operate integrally, the inner peripheral ring pieces 12, 13 operate similarly to the embodiment illustrated in FIG. 2 and so on described above, so that no gas passage is formed, thereby making it possible to avoid or reduce leakage of blowby gas.

Figure 6B:
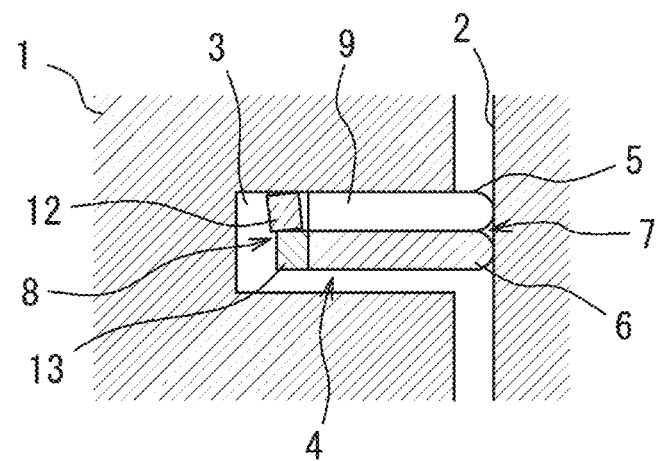
FIG. 6B is a partial sectional view to describe the embodiment in which the inner peripheral ring is divided into two pieces in the up-down direction and is a partial sectional view of a section taken along a part corresponding to a piston ring gap portion of a ring piece on the upper side in a case where the piston ring adheres to the upper face of the ring groove and an inner peripheral ring piece on the upper side deforms due to a gas pressure.
Figure 6C:
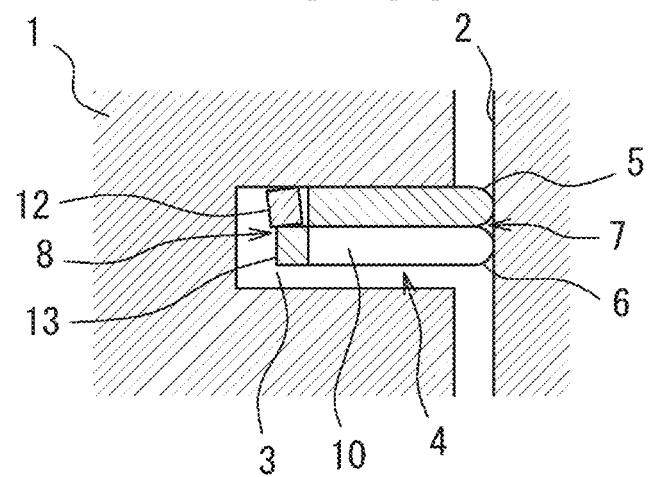
FIG. 6C is a partial sectional view to describe the embodiment in which the inner peripheral ring is divided into two pieces in the up-down direction and is a partial sectional view of a section taken along a part corresponding to a piston ring gap portion of a ring piece on the lower side in the case where the piston ring adheres to the upper face of the ring groove and the inner peripheral ring piece on the upper side deforms due to a gas pressure.

Note that, in the configuration illustrated in FIG. 6A, in a case where the piston ring 4 makes contact with the upper face of the ring groove 3, the internal pressure (gas pressure) in the cylinder works to bend the inner peripheral ring piece 12 on the upper side in the piston ring gap portion 9 of the ring piece 5 on the upper side. This state is illustrated in FIG. 6B. When the gas pressure is large, part of the inner peripheral ring piece 12 may deform in a direction where the inside diameter of the inner peripheral ring piece 12 is decreased. FIG. 6C illustrates a state where part of the inner peripheral ring piece 12 on the upper side deforms as described above in the vicinity of the piston ring gap portion 10 in the ring piece 6 on the lower side. In this state, the inner peripheral ring piece 12 on the upper side is separated from the inner peripheral surface of the ring piece 5 on the upper side, so that a gap is formed between the inner peripheral ring piece 12 on the upper side and the inner peripheral surface of the ring piece 5 on the upper side. However, since the inner peripheral ring 8 is constituted by the inner peripheral ring pieces 12, 13 divided in the up-down direction, the deformation of the inner peripheral ring piece 12 on the upper side does not affect the inner peripheral ring piece 13 on the lower side, and the inner peripheral ring piece 13 on the lower side adheres to the inner peripheral surface of the ring piece 6 on the lower side and closes the piston ring gap portion 10. As such, even when the inner peripheral ring piece 12 on the upper side deforms by a gas pressure, a gas passage via which the combustion chamber communicates with the crank chamber is not formed, thereby making it possible to effectively prevent or restrain leakage of blowby gas.

Figure 7:
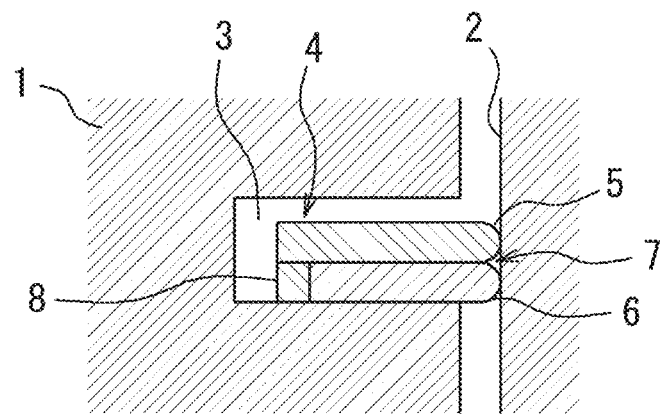
FIG. 7 is a partial sectional view to describe an embodiment in which the inner peripheral ring is provided only for the ring piece on the lower side.

Note that a special action obtained by dividing the inner peripheral ring 8 in the width direction (the up-down direction) is exercised when the piston ring 4 sticks to the upper face of the ring groove 3. Accordingly, in an engine in which the piston ring 4 does not stick to the upper face of the ring groove 3 or an engine in which the piston ring 4 hardly sticks to the upper face of the ring groove 3, the inner peripheral ring 8 may be provided only for the ring piece 6 on the lower side. An example of this case is illustrated in FIG. 7 as a partial sectional view. Note that the thickness (a dimension measured in the radial direction) of the ring piece 5 on the upper side is equal to or more than the thickness of the ring piece 6 on the lower side, preferably larger than the thickness of the ring piece 6 on the lower side. This is to surely cover the piston ring gap portion 10 of the ring piece 6 on the lower side with the ring piece 5 on the upper side.

In the configuration illustrated in FIG. 7, a gap is formed between the piston ring 4 and the upper face of the ring groove 3, and the ring piece 5 on the upper side is opened at the piston ring gap portion 9. Further, the inner peripheral ring 8 provided for the ring piece 6 on the lower side is opened at the piston ring gap portion 11 of the inner peripheral ring 8. Accordingly, the combustion chamber or the gap between the piston 1 and the bore 2 communicates with the inside of the ring groove 3. However, the piston ring gap portion 10 of the ring piece 6 on the lower side that communicates with the crank chamber is closed to the inside of the ring groove 3 by the inner peripheral ring 8 because the inner peripheral ring 8 adheres to the inner peripheral surface of the ring piece 6 on the lower side. That is, a gas passage via which the combustion chamber communicates with the crank chamber is not formed, thereby making it possible to prevent or restrain leakage of blowby gas, similarly to the examples illustrated in FIG. 3 and FIG. 6A.

Figure 8:
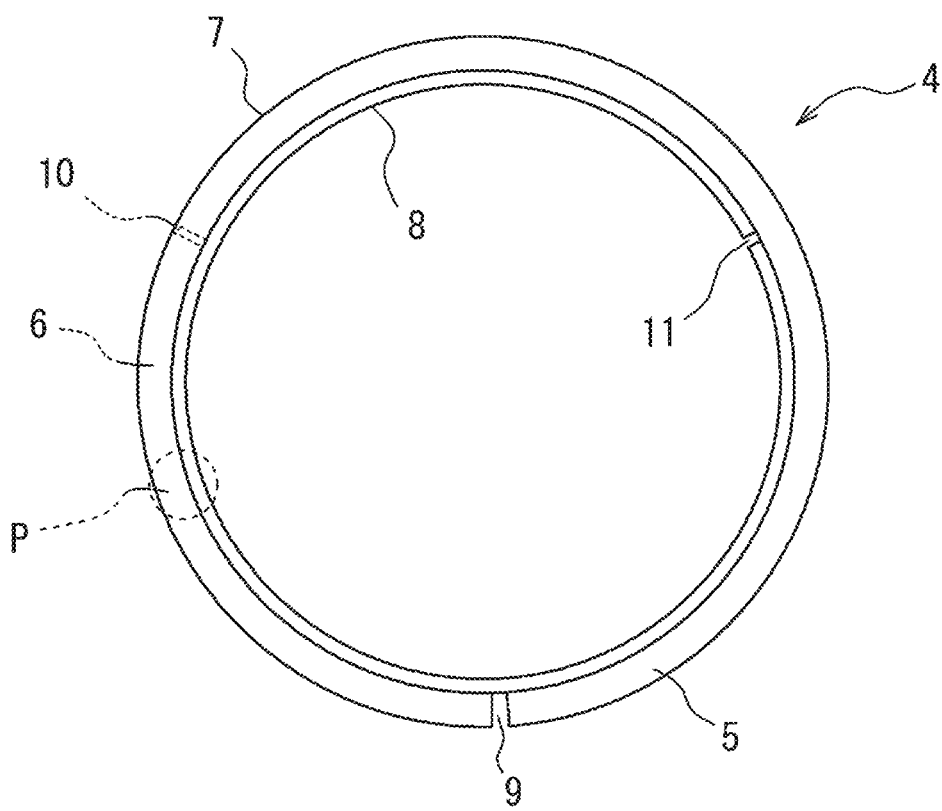
FIG. 8 is a plan view illustrating an example of relative positions between respective piston ring gap portions of ring pieces of an outer peripheral ring and the inner peripheral ring and a joining position between the outer peripheral ring and the inner peripheral ring.

Similarly to a piston ring known in the related art, the piston ring 4 in the embodiment of the present disclosure is elastically deformed such that the inside diameter of the piston ring 4 increases, and in this state, the piston ring 4 is fitted onto the outer peripheral side of the piston 1 and then fit into the ring groove 3 such that the inside diameter is decreased by its own elastic force. In a case where such an assembling operation is performed, a plurality of ring pieces constituting the outer peripheral ring 7, the inner peripheral ring 8, and so on are integrally assembled to the piston 1 as the piston ring 4 in the embodiments of the present disclosure. In view of this, it is preferable to configure the piston ring 4 such that the ring pieces do not disassemble from each other. An example of such a configuration is illustrated in FIG. 8. In the example illustrated herein, the ring pieces 5, 6 and the inner peripheral ring 8 assembled such that the piston ring gap portions 9, 10, 11 are displaced from each other in the circumferential direction are joined to each other at a part P deviating from the piston ring gap portions 9, 10, 11. The joining may be performed by welding, bonding by adhesive, or the like or may be performed by binding by use of a string or the like that is removed after the assembling to the ring groove 3. Furthermore, the adhesive may be an adhesive that melts or disappears over time. Still further, a dimple and a projection configured to engage with each other can be employed as joining means.

Figure 9A:
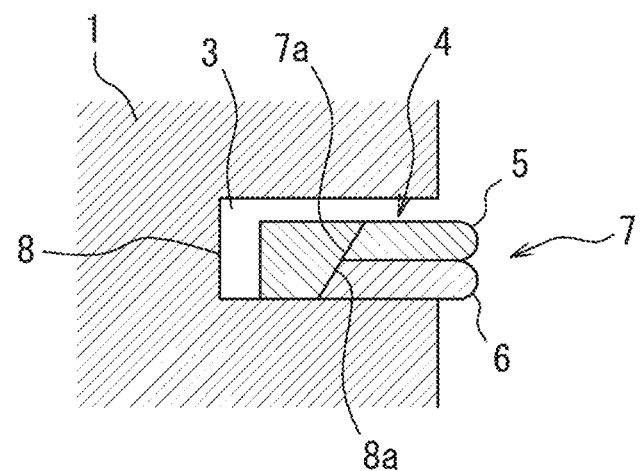
FIG. 9A is a schematic partial sectional view to describe an example in which the outer peripheral ring is pressed against a lower face side of the ring groove and illustrates an example in which the outer peripheral surface of the inner peripheral ring is constituted by a single inclined surface.
Figure 9B:
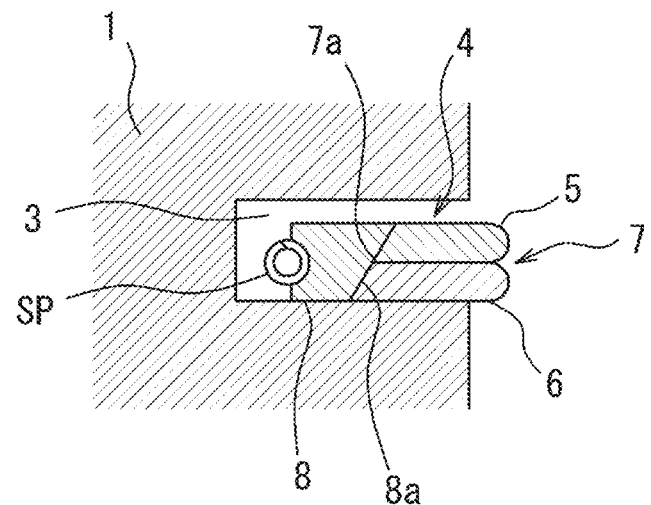
FIG. 9B is a schematic partial sectional view to describe the example in which the outer peripheral ring is pressed against the lower face side of the ring groove and illustrates an example in which a spring is further provided on the inner peripheral side of the inner peripheral ring.

In the meantime, the inner peripheral ring 8 or the inner peripheral ring pieces 12, 13 are to expand by their own elastic forces, so that a radial force works between the inner peripheral ring 8 or the inner peripheral ring pieces 12, 13 and the outer peripheral ring 7. In an embodiment of the present disclosure, the radial force can be set to be used more effectively. An example of this will be described as follows. The example illustrated in FIG. 9A and FIG. 9B is an example in which the outer peripheral ring 7 is pressed against the lower face of the ring groove 3 by the radial force of the inner peripheral ring 8. The outer peripheral surface of the inner peripheral ring 8 illustrated herein is formed as an inclined surface 8a the outside diameter of which increases toward the upper side. In the meantime, the inner peripheral surface of the outer peripheral ring 7 in which the ring pieces 5, 6 are stacked in the up-down direction is formed as an inclined surface 7a the inside diameter of which increases toward the upper side so as to correspond to the outer peripheral surface of the inner peripheral ring 8. Accordingly, a downward component force is caused based on a force by which the inner peripheral ring 8 is to expand outwardly in the radial direction between the outer peripheral surface of the inner peripheral ring 8 and the inner peripheral surface of the outer peripheral ring 7, so that the outer peripheral ring 7 can be pressed against the lower face of the ring groove 3 by the component force as illustrated in FIG. 9A. Note that, as illustrated in FIG. 9B, a spring SP configured to cause an elastic force in the expansion direction may be provided on the inner peripheral side of the inner peripheral ring 8.

FIGS. 10A to 10D illustrate examples in which the ring pieces 5, 6 constituting the outer peripheral ring 7 are configured to be restricted in the width direction. In an outer peripheral portion of the inner peripheral ring 8 illustrated in FIG. 10A, a recessed portion 8b having a V-shaped section is formed such that a central part of the recessed portion 8b is hollowed most in the width direction (the up-down direction). In the meantime, a projection portion 5a having a right-angled triangular section is formed in an inner peripheral portion of the ring piece 5 on the upper side that constitutes the outer peripheral ring 7 such that an upper face side of the projection portion 5a is gradually inclined downward toward the lower face of the ring piece 5, and a projection portion 6a having a shape symmetric to the projection portion 5a is formed in an inner peripheral portion of the ring piece 6 on the lower side. That is, the projection portion 6a in the ring piece 6 on the lower side has a right-angled triangular section in which a lower face side of the projection portion 6a is gradually inclined upward toward the upper face of the ring piece 6. The projection portions 5a, 6a, are put together to form a projection portion having generally the same sectional shape as the sectional shape of the recessed portion 8b of the inner peripheral ring 8 and are inserted into the recessed portion 8b.

An elastic force is applied to the inner peripheral ring 8 in a direction to expand the outside diameter of the inner peripheral ring 8, and therefore, forces in directions to strongly fit to each other are applied between the projection portions 5a, 6a formed in the ring pieces 5, 6 of the outer peripheral ring 7 and the recessed portion 8b of the inner peripheral ring 8. In the meantime, respective contact faces of the projection portions 5a, 6a and the recessed portion 8b are inclined surfaces corresponding to their respective shapes. Eventually, forces to tighten the projection portions 5a, 6a in the width direction (the up-down direction) are applied between the projection portions 5a, 6a and the recessed portion 8b, so that the ring pieces 5, 6 are united together in the width direction (the up-down direction).

Figure 10A:
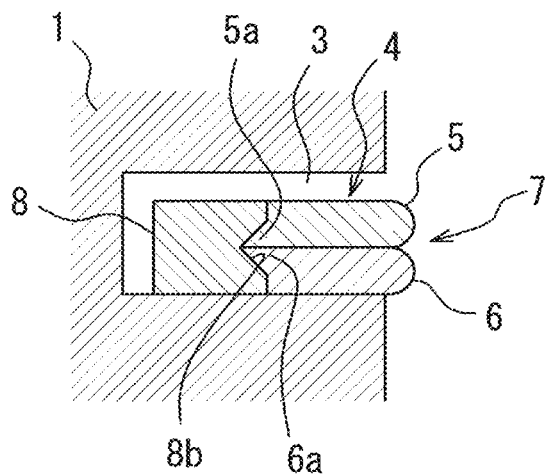
FIG. 10A is a schematic partial sectional view illustrating an example in which the ring pieces of the outer peripheral ring are restricted by the inner peripheral ring in the width direction and illustrates an example in which the ring pieces are restricted by one recessed portion.
Figure 10B:
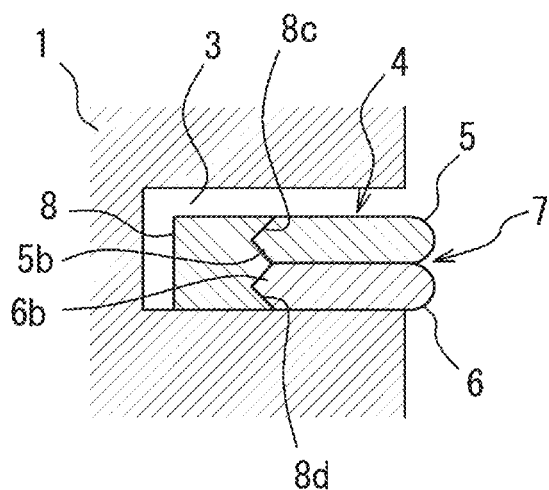
FIG. 10B is a schematic partial sectional view illustrating the example in which the ring pieces of the outer peripheral ring are restricted by the inner peripheral ring in the width direction and illustrates an example in which respective recessed portions are provided for the ring pieces.

The example illustrated in FIG. 10B is an example in which the ring pieces 5, 6 are individually restricted by the inner peripheral ring 8 in the width direction. Projection portions 5b, 6b each having a triangular section tapered toward its central part in the width direction are formed in respective inner peripheral portions of the ring pieces 5, 6. Further, recessed portions 8c, 8d corresponding to the projection portions 5b, 6b and having the same sectional shapes as the sectional shapes of the projection portions 5b, 6b are formed in the outer peripheral portion of the inner peripheral ring 8. Accordingly, when the projection portions 5b, 6b of the ring pieces 5, 6 fit within the recessed portions 8c, 8d, the ring pieces 5, 6 are restricted by the inner peripheral ring 8 in the width direction.

Figure 10C:
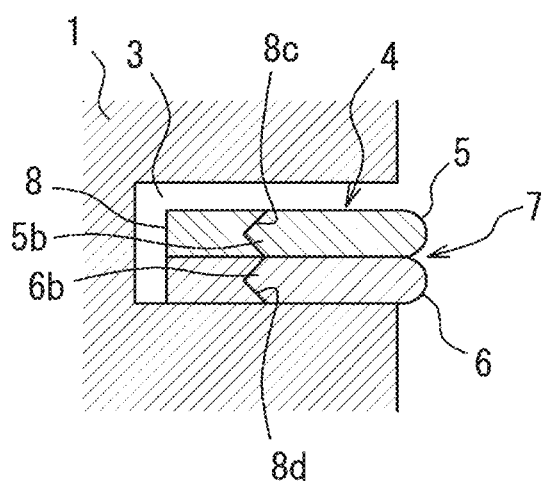
FIG. 10C is a schematic partial sectional view illustrating the example in which the ring pieces of the outer peripheral ring are restricted by the inner peripheral ring in the width direction and illustrates an example in which the inner peripheral ring is divided into two pieces in the up-down direction.
Figure 10D:
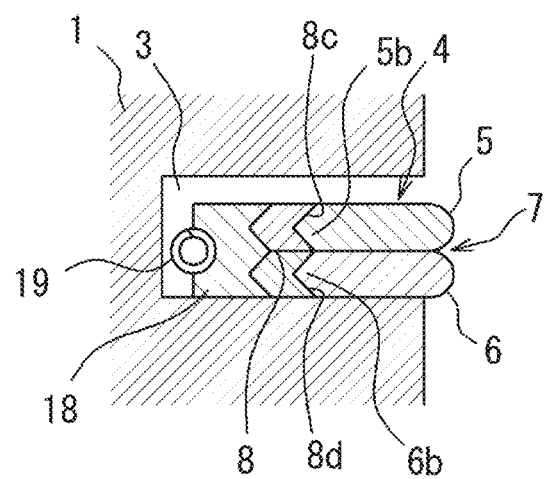
FIG. 10D is a schematic partial sectional view illustrating the example in which the ring pieces of the outer peripheral ring are restricted by the inner peripheral ring in the width direction and illustrates an example in which a spring is further provided on the inner peripheral side.

Further, FIG. 10C illustrates an example in which the inner peripheral ring 8 having the configuration illustrated in FIG. 10B is divided into two pieces in the up-down direction. Further, the example illustrated in FIG. 10D is an example in which, in addition to the configuration illustrated in FIG. 10C, a second inner peripheral ring 18 is provided on the inner peripheral side of the inner peripheral ring 8, and a spring 19 configured to cause an elastic force to press the second inner peripheral ring 18 outwardly in the radial direction is placed on the inner side of the second inner peripheral ring 18. The second inner peripheral ring 18 makes contact with each of the two pieces obtained by dividing the inner peripheral ring 8 in the up-down direction via a V-shaped recessed portion and a projection portion fitting within the recessed portion. Accordingly, the second inner peripheral ring 18 and the inner peripheral ring 8 are configured to be restricted in the up-down direction.

Note that, in any of the above embodiments, the ring pieces 5, 6 adhere to each other in the width direction, thereby making it possible to avoid a gas passage from being formed between the ring pieces 5, 6. Similarly, the ring piece 6 on the lower side or the inner peripheral ring 8 adheres to the lower face of the ring groove 3, and the ring piece 5 on the upper side or the inner peripheral ring 8 adheres to the upper face of the ring groove 3, thereby making it possible to avoid a gas passage from being formed. Accordingly, in the embodiments of the present disclosure, it is preferable to apply a resin coating on a part adhering to its counterpart member, e.g., respective upper faces and respective lower faces of the ring pieces 5, 6 and the inner peripheral ring 8, respective inner peripheral surfaces of the ring pieces 5, 6 and the outer peripheral surface of the inner peripheral ring 8, and so on.

Figure 11:
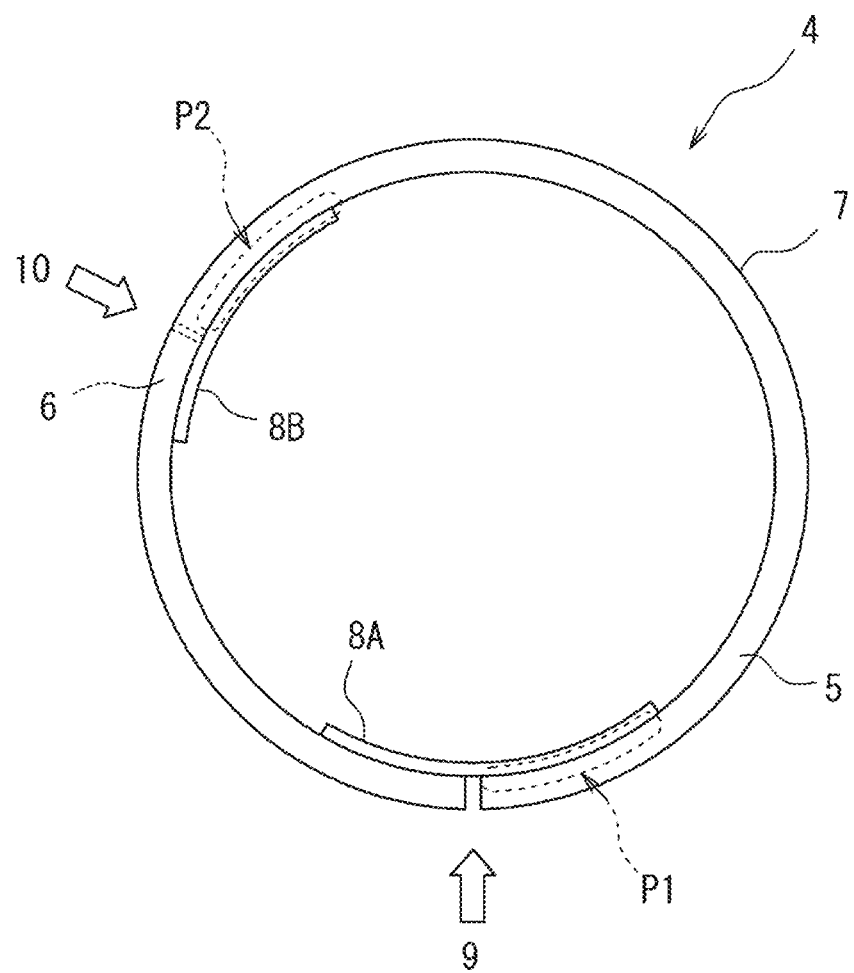
FIG. 11 is a plan view illustrating an example in which an arcuate piece is provided as a closing member.

The inner peripheral ring 8 in each of the above embodiments is a member configured to adhere to the inner peripheral surface of the outer peripheral ring 7 so as to function to close the piston ring gap portions 9, 10 provided in the ring pieces 5, 6. Accordingly, in each of the embodiments of the present disclosure, the member configured to adhere to the inner peripheral surface of the outer peripheral ring 7 may be arcuate pieces 8A, 8B provided for the piston ring gap portions 9, 10, respectively, instead of the ring-shaped member including the piston ring gap portion as described above. The arcuate pieces 8A, 8B correspond to a closing member or an inner-peripheral-side curved member in the present disclosure, and examples of the arcuate pieces 8A, 8B are illustrated in FIG. 11. The outer peripheral ring 7 is configured such that the ring piece 5 on the upper side and the ring piece 6 on the lower side are stacked in an adhering manner in the width direction. The ring piece 5 on the upper side includes the piston ring gap portion 9, and the ring piece 6 on the lower side is configured similarly to the ring piece 5 and includes the piston ring gap portion 10.

The arcuate piece 8A is placed on the inner peripheral side of the piston ring gap portion 9 of the ring piece 5 on the upper side such that the arcuate piece 8A extends to both sides across the piston ring gap portion 9 in the circumferential direction, and the arcuate piece 8A adheres to the inner peripheral surface of the ring piece 5 on the upper side and closes the piston ring gap portion 9. Further, a part of the arcuate piece 8A on either one of both sides thereof across the piston ring gap portion 9 in the circumference direction is joined to the ring piece 5 on the upper side. The joined part in the arcuate piece 8A is indicated by a reference sign P1. This allows the ring piece 5 on the upper side to elastically deform such that its outside diameter increases and decreases and also allows an unjoined end part of the arcuate piece 8A to press the ring piece 5 outwardly in the radial direction from the inner peripheral side so that the arcuate piece 8A and the ring piece 5 adhere to each other.

Similarly, the arcuate piece 8B is placed on the inner peripheral side of the piston ring gap portion 10 of the ring piece 6 on the lower side such that the arcuate piece 8B extends to both sides across the piston ring gap portion 10 in the circumferential direction, and the arcuate piece 8B adheres to the inner peripheral surface of the ring piece 6 on the lower side and closes the piston ring gap portion 10. Further, a part of the arcuate piece 8B on either one of both sides thereof across the piston ring gap portion 10 in the circumference direction is joined to the ring piece 6 on the lower side. The joined part in the arcuate piece 8B is indicated by a reference sign P2. This allows the ring piece 6 on the lower side to elastically deform such that its outside diameter increases and decreases and also allows an unjoined end part of the arcuate piece 8B to press the ring piece 6 outwardly in the radial direction from the inner peripheral side so that the arcuate piece 8B and the ring piece 6 adhere to each other.

The following describes further another embodiment of the present disclosure. The closing member of the present disclosure is a member functioning to close the piston ring gap portion 9, 10 in the outer peripheral ring 7 in the radial direction such as the inner peripheral ring 8 or the arcuate piece 8A, 8B as describe above. In view of this, the closing member may be a member configured to close the piston ring gap portion 9, 10 by being fitted in the piston ring gap portion 9, 10, instead of closing the piston ring gap portions 9, 10 by adhering to the inner peripheral surface of the outer peripheral ring 7. This example is illustrated in FIGS. 12A, 12B.

Figure 12A:
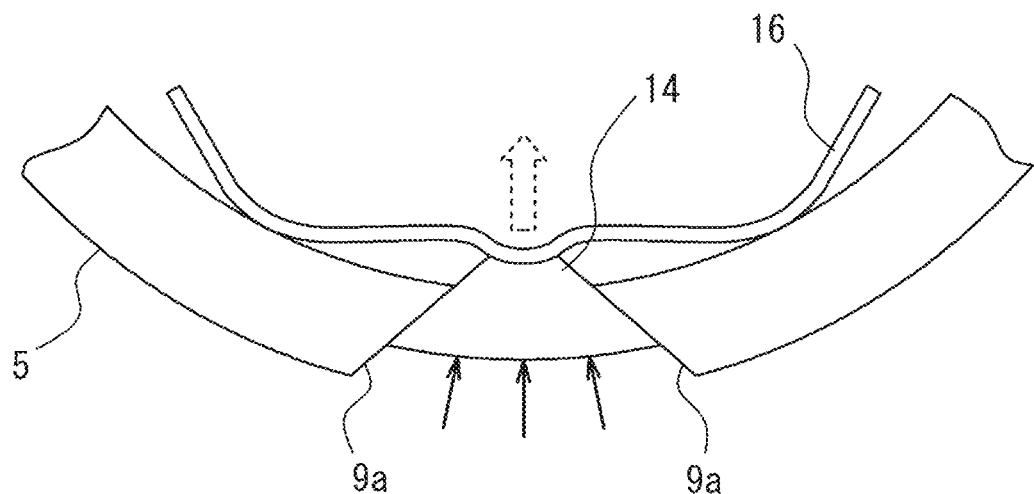
FIG. 12A is a partial plan view illustrating an example in which a plug piece is provided as a closing member and illustrates the plug piece and the piston ring gap portion in the ring piece on the upper side.

FIG. 12A schematically illustrates the piston ring gap portion 9 of the ring piece 5 on the upper side and a plug piece 14 fitted in the piston ring gap portion 9. End surfaces 9a facing each other in the circumferential direction and constituting the piston ring gap portion 9 correspond to a first end surface in the present disclosure, and the end surfaces 9a form a shape in which a space (a ring gap) between the end surfaces 9a gradually increases outwardly in the radial direction. That is, the end surfaces 9a are inclined in the radial direction or the circumferential direction such that the end surfaces 9a form a shape opened outwardly in the radial direction.

The plug piece 14 fitted in the piston ring gap portion 9 corresponds to a first plug piece of the present disclosure and is configured to fill the piston ring gap portion 9 by airtightly making contact with the end surfaces 9a. In the example illustrated in FIG. 12A, the plug piece 14 has a generally fan shape and is provided as a plate piece having the same width as the ring piece 5. Note that surfaces of the plug piece 14 that make contact with the end surfaces 9a may be flat surfaces similarly to the end surfaces 9a or may be protruding curved surfaces that can make contact with the end surfaces 9a with an airtight state being maintained. The plug piece 14 is fitted in the piston ring gap portion 9 from the outer side toward the inner side in the radial direction. Here, the end surfaces 9a are inclined surfaces as described above. Accordingly, when the ring gap in the piston ring gap portion 9 changes due to changes in the outside diameter of the ring piece 5, the plug piece 14 moves inwardly or outwardly in the radial direction so as to always fill the space between the end surfaces 9a airtightly. Further, the peripheral length (the length in the circumferential direction) of the plug piece 14 is longer on the outer peripheral side and shorter on the inner peripheral side. In other words, in a state where the piston ring 4 is placed inside the ring groove 3 described above, the pressure receiving area of the plug piece 14 on the outer peripheral side is wider than the pressure receiving area thereof on the inner peripheral side. Accordingly, the plug piece 14 is pushed inwardly in the radial direction by a gas pressure.

Figure 12B:
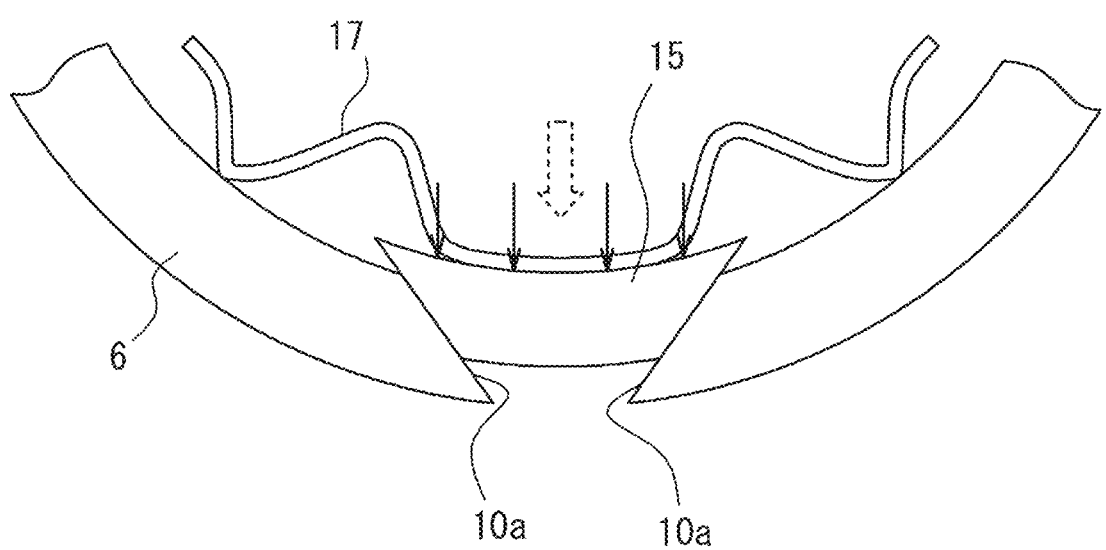
FIG. 12B is a partial plan view illustrating the example in which the plug piece is provided as the closing member and illustrates the plug piece and the piston ring gap portion in the ring piece on the lower side.

FIG. 12B schematically illustrates the piston ring gap portion 10 of the ring piece 6 on the lower side and a plug piece 15 fitted in the piston ring gap portion 10. The piston ring gap portion 10 and the plug piece 15 have a structure reverse to the structure illustrated in FIG. 12A such that the plug piece 15 is pressed outwardly in the radial direction to airtightly close the piston ring gap portion 10 in the radial direction. More specifically, end surfaces 10a facing each other in the circumferential direction and constituting the piston ring gap portion 10 correspond to a second end surface in the present disclosure, and the end surfaces 10a form a shape in which a space (a ring gap) between the end surfaces 10a gradually decreases outwardly in the radial direction. That is, the end surfaces 10a are inclined in the radial direction or the circumferential direction such that the end surfaces 10a form a shape opened inwardly in the radial direction.

The plug piece 15 fitted in the piston ring gap portion 10 corresponds to a second plug piece in the present disclosure and is configured to fill the piston ring gap portion 10 by airtightly making contact with the end surfaces 10a. In the example illustrated in FIG. 12B, the plug piece 15 has a generally fan shape and is provided as a plate piece having the same width as the ring piece 6. Note that surfaces of the plug piece 15 that make contact with the end surfaces 10a may be flat surfaces similarly to the end surfaces 10a or may be protruding curved surfaces that can make contact with the end surfaces 10a with an airtight state being maintained. The plug piece 15 is fitted in the piston ring gap portion 10 from the inner side toward the outer side in the radial direction. The end surfaces 10a are inclined surfaces as described above. Accordingly, when the ring gap in the piston ring gap portion 10 changes due to changes in the outside diameter of the ring piece 6, the plug piece 15 moves inwardly or outwardly in the radial direction so as to always fill the space between the end surfaces 10a airtightly. Further, the peripheral length (the length in the circumferential direction) of the plug piece 15 is longer on the inner peripheral side and shorter on the outer peripheral side. In other words, in a state where the piston ring 4 is placed inside the ring groove 3 described above, the pressure receiving area of the plug piece 15 on the inner peripheral side is wider than the pressure receiving area thereof on the outer peripheral side, so that the plug piece 15 is pushed outwardly in the radial direction by a gas pressure.

The ring pieces 5, 6 including the plug pieces 14, 15, respectively, are placed inside the ring groove 3 such that the ring pieces 5, 6 are stacked in an adhering state in a state where the piston ring gap portions 9, 10 are displaced from each other in the circumferential direction. In a state where the piston ring 4 adheres to the lower face of the ring groove 3, a gap is formed between the upper face of the piston ring 4 and the upper face of the ring groove 3, so that the combustion chamber communicates with the inside of the ring groove 3. In this case, since the plug piece 14 in the ring piece 5 on the upper side is configured such that the pressure receiving area on the outer peripheral side is wider than the pressure receiving area on the inner peripheral side, the plug piece 14 is pressed inwardly in the radial direction against the piston ring gap portion 9. Accordingly, the plug piece 14 adheres to the end surfaces 9a of the piston ring gap portion 9, so that the piston ring gap portion 9 is airtightly closed in the radial direction of the piston ring 4. Further, when the plug piece 14 is pushed deeply into the piston ring gap portion 9 in the radial direction, a gap may be formed between the outer peripheral surface of the plug piece 14 and the inner peripheral surface of the bore 2. However, since the ring piece 6 on the lower side is placed below the piston ring gap portion 9 in an adhering state, the gap is sealed in the up-down direction (the width direction of the piston ring 4). That is, the piston ring gap portion 9 does not serve as a gas passage via which the upper side and the lower side of the piston ring 4 communicate with each other, that is, the combustion chamber and the crank chamber communicate with each other.

Further, in the meantime, in the ring piece 6 on the lower side, the plug piece 15 is pushed into the piston ring gap portion 10 from the inner peripheral side toward the outer peripheral side as illustrated in FIG. 12B. The plug piece 15 is configured to close the piston ring gap portion 10 and is not configured to close the gap between the ring piece 6 and the inner peripheral surface of the bore 2. Accordingly, as illustrated in FIG. 12B, a slight gap is formed on the outer peripheral side of the plug piece 15, and the gap communicates with the crank chamber. Accordingly, the gas pressure in the combustion chamber is applied to the inner peripheral surface of the plug piece 15, so that the plug piece 15 is pressed outwardly in the radial direction. Accordingly, the plug piece 15 adheres to the end surfaces 10a, of the piston ring gap portion 10, so that the piston ring gap portion 10 is airtightly closed in the radial direction of the piston ring 4. Further, the ring piece 6 on the lower side and the plug piece 15 adhere to the lower face of the ring groove 3 and seals the inside of the ring groove 3 to the crank chamber. That is, the piston ring gap portion 10 does not serve as a gas passage via which the upper side and the lower side of the piston ring 4 communicate with each other, that is, the combustion chamber and the crank chamber communicate with each other.

Note that, in a state where the engine is operated, the gas pressure in the combustion chamber increases, so that the plug pieces 14, 15 can be pressed against the end surfaces 9a, 10a of the piston ring gap portions 9, 10. In the meantime, in a state where the engine is not operated, the gas pressure is not applied to the plug pieces 14, 15. Accordingly, the plug pieces 14, 15 may move inside the piston ring gap portions 9, 10, so that collision noise or hitting sound may be caused. In order to avoid such an inconvenience, elastic members configured to apply forces in respective directions to push the plug pieces 14, 15 into the piston ring gap portions 9, 10 can be used. Examples of the elastic members are illustrated in FIGS. 12A, 12B.

A leaf spring 16 is provided for the plug piece 14 in the ring piece 5 on the upper side such that the leaf spring 16 curves in a wave shape in which a central part of the leaf spring 16 is joined to the inner peripheral surface of the plug piece 14, and right and left sides of the leaf spring 16 make contact with the inner peripheral surface of the ring piece 5. The leaf spring 16 corresponds to a first pressing member in the present disclosure. The leaf spring 16 is assembled to the inner side of the ring piece 5 in a state where right and left sides of the leaf spring 16 are elastically deformed to the inner side of the ring piece 5. Accordingly, an elastic force is caused in a direction where the central part of the leaf spring 16 to which the plug piece 14 is joined is displaced inwardly in the radial direction. Due to the elastic force, the plug piece 14 is pulled inwardly in the radial direction inside the piston ring gap portion 9 and adheres to the end surfaces 9a.

Similarly, a leaf spring 17 is provided for the plug piece 15 in the ring piece 6 on the lower side such that the leaf spring 17 curves in a wave shape in which a central part of the leaf spring 17 makes contact with the inner peripheral surface of the plug piece 15, and right and left sides of the leaf spring 17 are joined to the inner peripheral surface of the ring piece 6. The leaf spring 17 corresponds to a second pressing member in the present disclosure. The leaf spring 17 is assembled to the inner side of the ring piece 6 in a state where the central part of the leaf spring 17 is elastically deformed to the inner side of the ring piece 6. Accordingly, an elastic force is caused in a direction where the central part of the leaf spring 17 that makes contact with the plug piece 15 is displaced outwardly in the radial direction. Due to the elastic force, the plug piece 15 is pulled outwardly in the radial direction inside the piston ring gap portion 10 and adheres to the end surfaces 10a.

Figure 13:
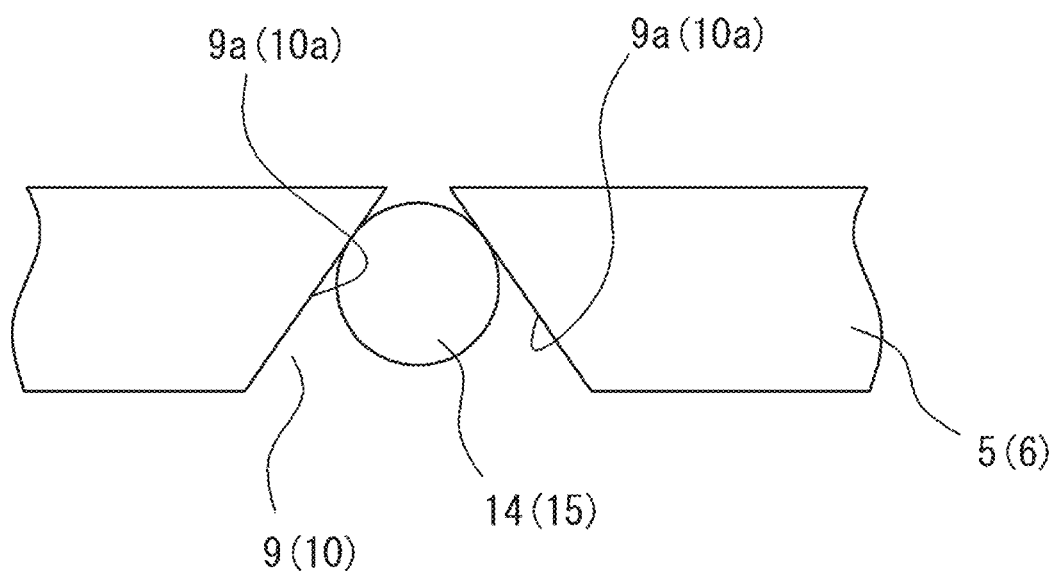
FIG. 13 is a partial plan view illustrating a columnar plug piece.

Here, the plug piece corresponding to the closing member in the present disclosure is further described. The plug piece should be sandwiched between end surfaces constituting a piston ring gap portion so as to fill a ring gap such that the piston ring gap portion is closed in the radial direction. Accordingly, the shape of the plug piece may be determined appropriately in design and may be columnar as illustrated in FIG. 13, for example, other than a shape similar to the shape of the opening of the piston ring gap portion. Note that, in order to avoid a gap from being formed on either of the upper side and the lower side of the plug piece, the plug piece is configured to have the same width (dimension in the up-down direction) as the width of the ring piece.

The embodiments of the present disclosure have been described above. However, the present disclosure is not limited to the embodiments, and the outer peripheral ring is not limited to the configuration in which two ring pieces are stacked and may be configured such that a plurality of ring pieces is stacked. In a case where three or more ring pieces are stacked, all piston ring gap portions may not be necessarily displaced from each other in the circumferential direction, provided that a piston ring gap portion in an uppermost ring piece is displaced, in the circumferential direction, from a piston ring gap portion in a ring piece right under the uppermost ring piece. Further, the present disclosure can be carried out by appropriately combining the configurations described in the embodiments. For example, the plug piece may be employed for the ring piece on the upper side, and the inner peripheral ring may be provided for the ring piece on the lower side. Alternatively, the inner peripheral ring may be provided for the ring piece on the upper ring, and the plug piece may be employed for the ring piece on the lower side. Further, the present disclosure is mainly applicable to a compression ring, and also the present disclosure is applied to other compression rings except a top ring. Only a top ring among a plurality of piston rings may have the configuration of the present disclosure, and the other piston rings may be configured differently from the top ring.

What is claimed is:

1. A piston ring having an annular shape opened at a piston ring gap portion, the piston ring being placed inside a ring groove formed in an outer peripheral portion of a piston configured to reciprocate inside a bore along an axis direction of the bore, the piston ring being configured to slide with an outer peripheral portion of the piston ring being pressed against an inner peripheral surface of the bore, the piston ring comprising:
    a plurality of first ring pieces placed inside the ring groove in a stacking manner such that the first ring pieces adhere to each other in the axis direction; and
    a closing member,
wherein
    the first ring pieces include respective piston ring gap portions each having end surfaces separated from each other via a ring gap having a predetermined dimension in a circumferential direction of the first ring pieces,
    the respective piston ring gap portions of the first ring pieces are displaced from each other in the circumferential direction,
    the closing member is provided to close the piston ring gap portions of the first ring pieces in a radial direction of the first ring pieces,
    the piston ring gap portion of a first ring piece on an uppermost side in the axis direction among the first ring pieces has a pair of first end surfaces separated from each other via a first predetermined ring gap in the circumferential direction,
    the first predetermined ring gap as a space between the first end surfaces gradually decreases inwardly in a radial direction of the first ring piece on the uppermost side,
    the closing member includes a first plug piece between the first end surfaces, and
    the first plug piece is configured to move inwardly, by a pressure applied to an outer peripheral side of the first ring piece on the uppermost side, from a first radial position to a second radial position in the radial direction of the first ring piece while an airtight state where the first plug piece is in contact with the first end surfaces is maintained.

2. The piston ring according to claim 1, further comprising a first pressing member provided on an inner peripheral side of the piston ring gap portion of the first ring piece on the uppermost side and configured to elastically press the first plug piece inwardly in the radial direction of the first ring piece on the uppermost side.

3. The piston ring according to claim 1, wherein
    the piston ring gap portion of a second first ring piece placed below the first ring piece on the uppermost side in the axis direction has a pair of second end surfaces separated from each other via a second predetermined ring gap in the circumferential direction
    the second predetermined ring gap as a space between the second end surfaces gradually decreases outwardly in a radial direction of the second first ring piece,
    the closing member further includes a second plug piece between the second end surfaces, and
    the second plug piece is configured to move outwardly, by a pressure applied to an inner peripheral side of the second first ring piece, from a first radial position to a second radial position in the radial direction of the second first ring piece while an airtight state where the second plug piece is in contact with the second end surfaces is maintained.

4. The piston ring according to claim 3, further comprising a second pressing member provided on an inner peripheral side of the piston ring gap portion of the second first ring piece and configured to elastically press the second plug piece outwardly in the radial direction of the second first ring piece.

5. The piston ring according to claim 3, wherein
    a peripheral length in the circumferential direction of the first plug piece on the outer peripheral side is longer than a peripheral length in the circumferential direction of the first plug piece on an inner peripheral side opposite to the outer peripheral side in the radial direction of the first ring piece on the uppermost side.

6. The piston ring according to claim 5, wherein
    a peripheral length in the circumferential direction of the second plug piece on the inner peripheral side of the second first ring piece is longer than a peripheral length in the circumferential direction of the second plug piece on an outer peripheral side opposite to the inner peripheral side in the radial direction of the second first ring piece.

7. The piston ring according to claim 6, wherein
    in a state where the piston ring is placed inside the ring groove, a pressure receiving area of the first plug piece on the outer peripheral side is wider than a pressure receiving area of the first plug piece on the inner peripheral side.

8. The piston ring according to claim 6, wherein
    in the state where the piston ring is placed inside the ring groove, a pressure receiving area of the second plug piece on the inner peripheral side is wider than a pressure receiving area of the second plug piece on the outer peripheral side.

9. The piston ring according to claim 8, wherein
the peripheral length in the circumferential direction of the first plug piece on the outer peripheral side and on an upper side of the first plug piece is same as a peripheral length in the circumferential direction of the first plug piece on the outer peripheral side and on a lower side of the first plug piece, the upper side being opposite to the lower side in the axial direction.

10. The piston ring according to claim 9, further comprising:
a first pressing member provided on an inner peripheral side of the piston ring gap portion of the first ring piece on the uppermost side and configured to elastically press the first plug piece inwardly in the radial direction of the first ring piece on the uppermost side, and
a second pressing member provided on an inner peripheral side of the piston ring gap portion of the second first ring piece and configured to elastically press the second plug piece outwardly in the radial direction of the second first ring piece.

11. The piston ring according to claim 10, wherein
the first pressing member is a first leaf spring that curves in a wave shape in which a central part of the first leaf spring is joined to an inner peripheral surface of the first plug piece, and right and left sides of the first leaf spring are in contact with an inner peripheral surface of the first ring piece on the uppermost side.

12. The piston ring according to claim 11, wherein
the second pressing member is a second leaf spring that curves in a wave shape in which a central part of the second leaf spring is joined to an inner peripheral surface of the second plug piece, and right and left sides of the second leaf spring are in contact with an inner peripheral surface of the second first ring piece.

* * * * *